United States Patent
Takesue et al.

(10) Patent No.: US 6,251,991 B1
(45) Date of Patent: Jun. 26, 2001

(54) GOLF BALL COVER STOCKS AND GOLF BALLS

(75) Inventors: Rinya Takesue; Yasushi Ichikawa; Shunichi Kashiwagi, all of Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/179,839

(22) Filed: Oct. 28, 1998

(30) Foreign Application Priority Data

Oct. 28, 1997 (JP) .................................................. 9-311278
Oct. 28, 1997 (JP) .................................................. 9-311279

(51) Int. Cl.$^7$ ............................................... C08L 75/00
(52) U.S. Cl. .......................... 525/66; 473/378; 525/131; 525/919

(58) Field of Search .................... 525/131, 66, 919; 473/378

(56) References Cited

U.S. PATENT DOCUMENTS

| | | |
|---|---|---|
| 3,395,109 | 7/1968 | Molitor et al. . |
| 4,248,432 | 2/1981 | Hewitt et al. ................ 273/235 R |
| 4,442,282 | 4/1984 | Kolycheck ..................... 528/83 |
| 4,674,751 * | 6/1987 | Molitor et al. ................ 273/235 R |
| 5,919,862 * | 7/1999 | Rajagopalan ................... 525/63 |

* cited by examiner

Primary Examiner—Ana Woodward
(74) Attorney, Agent, or Firm—Sughrue, Mion, Zinn, Macpeak & Seas, PLLC

(57) ABSTRACT

A cover stock composed mainly of a heated mixture of a thermoplastic polyurethane elastomer and a polyolefin oligomer or polyolefin which has been modified with functional groups is suitable for the manufacture of golf balls. The cover made of the stock has improved scuff resistance.

4 Claims, No Drawings

GOLF BALL COVER STOCKS AND GOLF BALLS

BACKGROUND OF THE INVENTION

1. Field of the Invention

This invention relates to cover stocks for golf balls having improved scuff resistance and golf balls having covers formed of the stocks.

2. Prior Art

In prior art golf balls, balata or trans-polyisoprene and ionomer resins are often used as the cover stock. Professional and skilled golfers prefer golf balls using balata as the cover stock, because the balata cover balls have good feel upon full shots with a driver and the ease of control (or spin susceptibility) upon approach shots.

The balata cover balls, however, have the drawback that the ball surface is marred or fluffed as a consequence of iron shots because the cover surface can be scraped by grooves across the iron club face. In addition, balata cover stocks are expensive and low in productivity because of difficulty to mold and a need for vulcanization.

Efforts have been made to seek for cover stocks having good feel and controllability comparable to the balata while eliminating the drawbacks of the balata. For example, cover stocks using thermoplastic polyurethane elastomers as disclosed in U.S. Pat. Nos. 3,395,109, 4,248,432, and 4,442,282 are relatively inexpensive as compared with the balata and easy to mold. Golf balls using these cover stocks offer good feel and controllability comparable to the balata cover balls. However, covers of thermoplastic polyurethane elastomers are still unsatisfactory in scuff resistance upon iron shots. Particularly at low temperatures or in winter, there is a likelihood that the ball surface can be cracked and dimples be scraped off by the iron club face.

Additionally, in golf ball cover stocks, metals salts of fatty acids such as magnesium stearate are generally blended as a dispersant. In a conventional process involving injection molding a cover stock having a fatty acid metal salt blended therein around a core to form a cover and painting the surface of the cover, the left-over of the fatty acid metal salt on the cover surface can adversely affect the adhesion of a paint coating to the cover.

SUMMARY OF THE INVENTION

An object of the invention is to provide a novel and improved golf ball cover stock capable of producing a golf ball of improved performance that offers improved scuff resistance against iron shots, the ease of control upon approach shots, and a very soft feel without shocks upon driver shots. Another object of the invention is to provide a golf ball using the cover stock.

In search of a golf ball cover stock which can offer a pleasant feel and is improved in controllability and scuff resistance, the inventors have found that a golf ball cover stock comprising as a main component a heated mixture of a thermoplastic polyurethane elastomer and a polyolefin oligomer or polyolefin which has been modified with functional groups is best suited for achieving the above and other objects.

More particularly, according to the invention, a heated mixture of (1) a thermoplastic polyurethane elastomer, especially a thermoplastic polyurethane elastomer having a Shore D hardness of 35 to 55 and comprising an aliphatic diisocyanate as the diisocyanate component and (2) a functional group-modified polyolefin oligomer or polyolefin which is expected to serve as a binder on account of the intermolecular interaction with polar groups (such as hydroxyl groups or urethane bonds) in the thermoplastic polyurethane elastomer, is used as the main component of the golf ball cover stock. Golf balls obtained by enclosing cores with this cover stock substantially solve the problem that as a consequence of iron shots, the cover surface can be scraped by grooves across the iron club face and the ball surface is marred or fluffed. Upon full shots with a driver, the balls offer a very soft feel without a shock and without a shortage of flight distance. Therefore, the cover stock of the above-described composition is significantly improved in function and effect over conventional cover stocks of thermoplastic polyurethane elastomers. Additionally, when a functional group-modified polyolefin oligomer with a relatively low molecular weight is used as component (2) of the heated mixture, the oligomer also serves as a dispersant for pigments and thus helps reduce the amount of a fatty acid metal salt (typically magnesium stearate) blended as the dispersant. The problem of poor adhesion of a paint coating caused by the presence of the fatty acid metal salt is thus substantially eliminated.

Accordingly, the present invention provides a golf ball cover stock comprising as a main component a heated mixture consisting essentially of a thermoplastic polyurethane elastomer and a polyolefin oligomer or polyolefin which has been modified with functional groups. Also contemplated herein is a golf ball comprising a core and a cover formed from the inventive cover stock.

DETAILED DESCRIPTION OF THE INVENTION

The cover stock for golf balls according to the invention uses as a main component a heated mixture of (1) a thermoplastic polyurethane elastomer and (2) a polyolefin oligomer or polyolefin which has been modified with functional groups.

The thermoplastic polyurethane elastomer (1) used herein has a molecular structure consisting of a polyol compound constituting a soft segment, a monomolecular chain extender constituting a hard segment, and a diisocyanate.

The polyol compound is not critical and may be any of polyester polyols, polyether polyols, copolyester polyols, and polycarbonate polyols. Exemplary polyester polyols include polycaprolactone glycol, poly(ethylene-1,4-adipate) glycol, and poly(butylene-1,4-adipate) glycol; an exemplary polyether polyol is polyoxytetramethylene glycol; an exemplary copolyester polyol is poly(diethylene glycol adipate) glycol; and an exemplary polycarbonate polyol is (hexanediol-1,6-carbonate) glycol. Their number average molecular weight is about 600 to 5,000, preferably about 1,000 to 3,000.

The diisocyanate may employ aromatic diisocyanates such as tolylene diisocyanate (TDI), diphenylmethane diisocyanate (MDI), tolidine diisocyanate (TODI), and naphthalene diisocyanate (NDI) are included although aliphatic diisocyanates are preferably used in consideration of the yellowing resistance of the cover. Examples of the aliphatic diisocyanate include hexamethylene diisocyanate (HDI), 2,2,4- or 2,4,4-trimethylhexamethylene diisocyanate (TMDI), and lysine diisocyanate (LDI). HDI is especially preferred for its compatibility with another resin upon blending.

The monomolecular chain extender is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethylmethanediamine (hydrogenated MDA), and isophoronediamine (IPDA).

For the thermoplastic polyurethane elastomers, those having a Shore D hardness of 35 to 55, especially 40 to 55 are preferred. With a Shore D hardness of less than 35, the ball would receive an increased spin rate and thus travel a short distance when hit with a driver. With a Shore D hardness of more than 55, the cover would be insufficiently soft and adversely affect the feel and control when hit. The specific gravity of the thermoplastic polyurethane elastomer is not critical and may be adjusted as appropriate insofar as the objects of the invention are achievable. Preferably the specific gravity is from 0.9 to 1.5, more preferably from 0.9 to 1.3, especially 1.0 to 1.2.

For the thermoplastic polyurethane elastomer, there may be used commercially available ones whose diisocyanate component is aliphatic, for example, Pandex T7298, EX7895, and T7890 (by Dai-Nippon Ink & Chemicals K.K.).

The second essential component of the cover stock according to the invention is (2-a) a polyolefin oligomer which has been modified with functional groups or (2-a) a polyolefin which has been modified with functional groups.

The modified polyolefin oligomers (2-a) usually have a number average molecular weight Mn of about 1,000 to 20,000, preferably about 1,500 to 17,000, more preferably about 1,500 to 16,000, especially about 1,500 to 15,000. Oligomers with Mn of less than 1,000 are less reactive with the thermoplastic polyurethane elastomer and sometimes fail to achieve an improvement in scuff resistance whereas oligomers with Mn of more than 20,000 would not serve as a dispersant for pigments.

Exemplary of the modified polyolefin oligomers are acid-modified polyolefin oligomers, epoxy group-modified polyolefin oligomers, hydroxyl group-modified polyolefin oligomers, and amino group-modified polyolefin oligomers.

Examples of the olefin component include ethylene, propylene, butene, hexene and octene, with the ethylene and propylene being preferred.

In the practice of the invention, acid-modified polyolefin oligomers are especially preferred as the modified polyolefin oligomer. Examples of the acid component include maleic acid, maleic anhydride, and sulfonic acid. Preferred are acid components having carboxyl groups or acid anhydride groups, such as maleic acid and maleic anhydride. Together with the acid-modified polyolefin oligomers, polymerizable monomers having an aliphatic unsaturated bond other than the olefin, for example, acrylates, methacrylates and vinyl acetate may be used as a comonomer for the purpose of softening the polyolefin oligomer. Exemplary acrylates and methacrylates are esters of (meth)acrylic acid with aliphatic alcohols of 1 to 4 carbon atoms in which some of the hydrogen atoms attached to carbon atoms may be replaced by hydroxyl groups or the like, for example, methyl (meth)acrylate, ethyl (meth)acrylate and butyl (meth)acrylate.

The acid-modified polyolefin oligomers preferably have an acid value of 1 to 60 mg KOH per gram, more preferably 10 to 60 mg KOH per gram as measured by titration assay. A polyolefin oligomer with an acid value of less than 1 mg KOH/g would react a very little with the thermoplastic polyurethane elastomer and be less dispersible. A polyolefin oligomer with an acid value of more than 60 mg KOH/g would react too much with the thermoplastic polyurethane elastomer so that the mixture might become less flowing and difficult to mold.

Suitable acid-modified polyolefin oligomers are commercially available, for example, under the trade name of Umex 200 and 1010 from Sanyo Chemicals K.K. and Bondyne AX8390 from Sumitomo Chemical K.K.

The functional group-modified polyolefins (2-b) usually have a number average molecular weight Mn of about 10,000 to 50,000, preferably about 15,000 to 48,000, more preferably about 17,000 to 45,000.

Exemplary of the modified polyolefins are acid-modified polyolefins, epoxy group-modified polyolefins, hydroxyl group-modified polyolefins, and amino group-modified polyolefins. Examples of the olefin component include ethylene, propylene, butene, hexene and octene, with the ethylene and propylene being preferred.

In the practice of the invention, epoxy-modified polyolefins are especially preferred as the modified polyolefin. Examples of the epoxy component include glycidyl methacrylate and glycidyl acrylate.

In addition to the olefin and epoxy components, polymerizable monomers having an aliphatic unsaturated bond other than the olefin, for example, acrylates, methacrylates and vinyl acetate may be used as a comonomer for the purpose of softening the polyolefin. Exemplary acrylates and methacrylates are esters of (meth)acrylic acid with aliphatic alcohols of 1 to 4 carbon atoms in which some of the hydrogen atoms attached to carbon atoms may be replaced by hydroxyl groups or the like, for example, methyl (meth)acrylate, ethyl (meth)acrylate and butyl (meth)acrylate.

Examples of the epoxy-modified polyolefin include ethylene/glycidyl (meth)acrylate, ethylene/n-butyl acrylate/glycidyl (meth)acrylate, ethylene/methyl acrylate/glycidyl (meth)acrylate, ethylene/acrylate/glycidyl (meth)acrylate, and ethylene/glycidyl (meth)acrylate/vinyl acetate copolymers. Suitable epoxy-modified polyolefins are commercially available, for example, under the trade name of Elvaloy AS and EP4934-6 from Mitsui-duPont Polychemical K.K.

The golf ball cover stock of the invention is obtained by mixing a thermoplastic polyurethane elastomer with a functional group-modified polyolefin oligomer or polyolefin and heating the mixture until the desired properties are achieved. When the polyolefin oligomer is used, the preferred mixing proportion is, 90 to 99.9 parts, especially 95 to 99.5 parts by weight of the thermoplastic polyurethane elastomer and 10 to 0.1 part, especially 5 to 0.5 parts by weight of the modified polyolefin oligomer, per 100 parts by weight of the mixture. A polyolefin oligomer content in excess of 10 parts by weight would lead to poor flight performance. With a polyolefin oligomer content of less than 0.1 part by weight, the cover would be low in scuff resistance, failing to produce a satisfactory golf ball. When the polyolefin is used, the preferred mixing proportion is 80 to 99.5 parts, especially 90 to 99.5 parts by weight of the thermoplastic polyurethane elastomer and 20 to 0.5 part, especially 10 to 0.5 parts by weight of the modified polyolefin, per 100 parts by weight of the mixture. A polyolefin content in excess of 20 parts by weight would lead to poor flight performance. With a polyolefin content of less than 0.5 part by weight, the cover would be low in scuff resistance, failing to produce a satisfactory golf ball.

The method of mixing and heating these components is not critical. In general, using internal mixers such as kneading twin-screw extruders, Banbury mixers and kneaders, the components are mixed and heated at a temperature of about 150 to 250° C. for about ½ to 15 minutes.

The heated mixture should preferably have a Shore D hardness of 35 to 55, and more preferably 45 to 55. With a Shore D hardness of less than 35, the resulting cover would become so soft that the ball might receive an increased spin rate and thus travel short when hit with a driver. With a Shore D hardness of more than 55, the resulting golf ball would fail to receive an appropriate back spin rate upon approach shots and become difficult to control. The heated mixture should preferably have a specific gravity of 0.9 to 1.5, more preferably 0.9 to 1.3, and most preferably 1.0 to 1.2, though the invention is not limited thereto.

In the present invention, the heated mixture of a thermoplastic polyurethane elastomer and a modified polyolefin oligomer or polyolefin constitutes the main component of the golf ball cover stock. The main component encompasses both the resin component of the cover stock consisting solely of the heated mixture and the resin component of the cover stock containing another resin or resins in addition to the heated mixture. Where the resin component of the cover stock consists solely of the heated mixture, non-resinous components such as titanium dioxide and barium sulfate are added in minor amounts. Then the hardness of the cover stock is substantially equal to that achieved when the thermoplastic polyurethane elastomer is used alone as the resin component. Where the resin component of the cover stock contains another resin or resins in addition to the heated mixture, ionomer resins, thermoplastic polystyrene elastomers and thermoplastic polyester elastomers may be used as the other resin. Preferably, the heated mixture of the two resin components according to the invention accounts for at least 70% by weight, more preferably at least 80% by weight of the cover stock resin component.

In addition to the essential components, various additives are added to the cover stock according to the invention, if necessary. Such additives are, for example, pigments, dispersants, antioxidants, UV absorbers and photostabilizers.

The cover stock of the invention is prepared, for example, by charging an internal mixer such as a kneading twin-screw extruder, Banbury mixer or kneader with the components, and mixing and heating them at a temperature of about 150 to 250° C. for about ½ to 15 minutes. In the mixing and heating step, the two resin components and other additives may be mixed and heated together to form a cover stock composition. Alternatively, the two resin components are mixed and heated before the mixture is further mixed with other additives.

The golf ball of the invention is comprised of a core and a cover formed thereon from the inventive cover stock. Included are wound golf balls and solid golf balls such as two, three and multi-piece solid golf balls.

In the manufacture of the golf ball of the invention, components other than the cover may be prepared by conventional well-known methods. Wound cores or solid cores are prepared in a conventional manner before they are enclosed with the inventive cover stock.

For example, the solid center for wound golf balls or the solid core for solid golf balls is prepared by blending 100 parts by weight of cis-1,4-polybutadiene with 10 to 60 parts by weight of a vulcanizing or crosslinking agent composed of an αβ-monoethylenically unsaturated carboxylic acid such as acrylic acid or methacrylic acid or a metal salt thereof, a functional monomer such as trimethylolpropane methacrylate, or a mixture thereof, 5 to 30 parts by weight a filler such as zinc oxide or barium sulfate, 0.5 to 5 parts by weight of a peroxide such as dicumyl peroxide, and optionally 0.1 to 1 part by weight of an antioxidant to form a rubber composition, and press molding and vulcanizing (or crosslinking) the rubber composition, for example, by heating under pressure at 140 to 170° C. for 10 to 40 minutes, thereby forming a spherical vulcanized part. The liquid center for wound golf balls are prepared, for example, by forming a hollow spherical center bag from the above-described rubber composition and filling the bag with a liquid in a well-known manner.

The core for wound golf balls is prepared by winding thread rubber under tension around the solid or liquid center prepared just above. The thread rubber used herein may be conventional one, for example, the one obtained by blending natural rubber or synthetic rubber (e.g., polyisoprene) with additives such as an antioxidant, vulcanization accelerator and sulfur and molding and vulcanizing the resulting rubber composition.

The weight, diameter, hardness and other parameters of the solid or liquid center, solid core, and wound core may be adjusted as appropriate insofar as the objects of the invention are achievable.

The method of enclosing a core with the cover stock of the invention is not critical. Well-known methods are employable. For example, a golf ball may be prepared by preforming hemispherical shells from the cover stock, enclosing a core with a pair of preformed shells, and then compression molding at about 120 to 170° C. for about 1 to 5 minutes. Alternatively, the molten cover stock is directly injection molded over a core in a mold.

The gage of the cover may be properly adjusted insofar as the objects of the invention are achievable. Usually the cover has a gage of 1 to 4 mm, especially 1.3 to 2.1 mm. The cover is not limited to a single layer and may be formed from two or more layers. In the case of a multi-layer cover, a layer(s) of the inventive cover stock may be combined with a layer(s) of conventional cover stock.

During or after the molding of the cover, a multiplicity of dimples are usually formed on the ball surface. If necessary, the molding of the cover is followed by surface treatments including stamping and paint coating. Since the cover of the inventive cover stock is well adherent, an adherent coating can be formed on the cover surface. The surface treatment can be carried out in a satisfactory manner.

The golf balls of the invention for competitive use are prepared in accordance with the Rules of Golf to a diameter of not less than 42.67 mm and a weight of not greater than 45.93 g.

There has been described a golf ball cover stock which offers a very soft feel without a substantial shock, the ease of control and improved scuff resistance.

EXAMPLE

Examples of the invention are given below by way of illustration and not by way of limitation.

Examples 1–4 and Comparative Examples 1–4

Solid cores having a diameter of 38.6 mm, a weight of 34.1 grams and a deflection of 3.0 mm under an applied load of 100 kg were prepared using a core composition containing cis-1,4-polybutadiene as a main component.

Next, the solid cores were set in molds, and cover stocks of the formulation shown in Table 1 obtained by heat kneading at 185° C. for ½ minute were injection molded over the cores to a gage of 2.0 mm, producing two-piece solid golf balls of Examples 1–4 and Comparative Examples 1–4.

The two-piece golf balls were examined for hardness, initial velocity, scuff resistance, contact angle and coating adhesion by the following tests. The results are shown in Table 2.

Hardness

Ball hardness was expressed by a deflection (mm) of a ball under an applied load of 100 kg.

Initial Velocity

An initial velocity (m/s) was measured by an initial speed meter of the same type as prescribed by USGA.

Snuff Resistance

Using a swing robot machine having a pitching wedge mounted, the ball was hit at a head speed of 33 m/s. The surface state of the ball after hitting was rated on a 5-point scale by a panel of ten observers. The rating is an average of ten ratings.

5: ball surface intact, or very slight club face dents
4: some club face dents, but no fluff on the cover surface
3: some club face dents, fluffy cover surface
2: fluffy cover surface, cracks
1: dimples scraped off crosscut sheet and then peeled therefrom. After tape peeling, the coating was visually observed to inspect whether or not coating sections were separated, and rated according to the following criteria.

| Point | Remarks |
|---|---|
| 10 | Each cut line was narrow and flanked by smooth edges. No separation was found at intersections between cut lines. No square sections were peeled. |
| 8 | Slight separation was found at intersections between cut lines. No square sections were peeled. Defective areas accounted for less than 5% of the total area of square sections. |
| 6 | Separation was found at opposite edges of cut lines and at intersections between cut lines. Defective areas accounted for 5% to less than 15% of the total area of square sections. |
| 4 | Separation was found over some extent along cut lines. Defective areas accounted for 15% to less than 35% of the total area of square sections. |
| 2 | Separation was found over a more extent along cut lines. Defective areas accounted for 35% to less than 65% of the total area of square sections. |
| 0 | Separation was found over a further extent along cut lines. Defective areas accounted for 65% or more of the total area of square sections. |

TABLE 1

| | Example | | | Comparative Example | | Example | Comparative Example | |
|---|---|---|---|---|---|---|---|---|
| Cover stock | 1 | 2 | 3 | 1 | 2 | 4 | 3 | 4 |
| Composition (pbw) | | | | | | | | |
| Pandex T7298 | 95 | 91 | 95 | 100 | 95 | 100 | 100 | 100 |
| Umex 1010 | 5 | 9 | | | | 0.7 | | |
| Umex 2000 | | | 5 | | | | | |
| Sanwax 131-P | | | | | 5 | | | 0.7 |
| Titanium dioxide | 2.5 | 2.5 | 2.5 | 2.5 | 2.5 | 2.5 | 2.5 | 2.5 |
| Magnesium stearate | 0.7 | 0.7 | 0.7 | 0.7 | 0.7 | | 0.7 | |
| Specific gravity | 1.16 | 1.14 | 1.16 | 1.18 | 1.16 | 1.17 | 1.18 | 1.17 |
| Hardness (Shore D) | 48 | 48 | 48 | 48 | 48 | 48 | 48 | 48 |

Contact Angle and Coating Adhesion

The respective cover stock resins were melted at 200° C. and press molded into test sheets of 1 mm thick. Each test sheet was conditioned at 23° C. and RH 50%. A drop of distilled water was applied to the test sheet, and a contact angle with water was measured. A urethane paint for golf balls was applied to the test sheet to a thickness of 15 μm, dried at 50° C., and left to stand at room temperature for 48 hours.

Then, a crosscut adhesive tape test was carried out according to JIS K-5400. The coated sheet was scribed in perpendicular directions at a line spacing of 1 mm to define 100 square sections in total. Adhesive tape was applied to the Pandex T7298: non-yellowing thermoplastic polyurethane elastomer, Shore D hardness 48, Dai-Nippon Ink & Chemicals K.K.

Umex 1010: polypropylene modified with maleic anhydride, acid value 52 mg KOH/g, Mn 7000, Sanyo Chemicals K.K.

Umex 2000: polyethylene modified with maleic anhydride, acid value 30 mg KOH/g, Mn 16000, Sanyo Chemicals K.K.

Sanwax 131-P: polyethylene wax, Mn 3500, Sanyo Chemicals K.K.

TABLE 2

| | Example | | | Comparative Example | | Example | Comparative Example | |
|---|---|---|---|---|---|---|---|---|
| | 1 | 2 | 3 | 1 | 2 | 4 | 3 | 4 |
| Ball weight (g) | 45.4 | 45.1 | 45.4 | 45.7 | 45.3 | 45.7 | 45.7 | 45.7 |
| Ball hardness (mm) | 2.73 | 2.70 | 2.70 | 2.73 | 2.65 | 2.83 | 2.76 | 2.76 |
| Initial velocity (m/s) | 75.3 | 75.2 | 75.3 | 75.4 | 75.3 | 75.4 | 75.5 | 75.5 |
| Scuff resistance (point) | 4.3 | 4.8 | 3.9 | 3.6 | 3.1 | 4.4 | 3.7 | 3.7 |
| Contact angle (°) | 60 | 51 | 69 | 75 | 75 | 70 | 75 | 74 |
| Coating adhesion (point) | 10 | 10 | 10 | 8 | 8 | 10 | 8 | 9 |

It is evident from Table 2 that inventive golf balls using cover stocks based on heated mixtures of a thermoplastic polyurethane elastomer and a functional group-modified polyolefin oligomer are improved in adhesion of paint coating to the cover and scuff resistance.

Example 5–9 and Comparative Examples 5–6

Solid cores having a diameter of 38.6 mm, a weight of 34.1 grams and a deflection of 3.0 mm under an applied load of 100 kg were prepared using a core composition containing cis-1,4-polybutadiene as a main component.

Next, cover stocks in pellet form were prepared by mixing components of the formulation shown in Table 3 in a kneading twin-screw extruder at 185° C. for ½ minute and extruding the mixture. The solid cores were set in molds, and the cover stocks were injection molded over the cores to a gage of 2.1 mm, producing two-piece solid golf balls of Examples 5–9 and Comparative Examples 5–6.

The two-piece golf balls were examined for weight, hardness, initial velocity, and scuff resistance as in Example 1 and for hitting feel by the following test. The results are shown in Table 4.

Hitting Feel

With a driver (W#1) PRO 230 Titan (loft angle 11°, shaft Harmotec Lite HM50J(HK), hardness S, balance D2, by Bridgestone Sports Co., Ltd.), an actual hitting test was performed by a panel of ten golfers with a head speed of about 45 m/sec (HS45). The ball was rated according to the following criterion. For each ball, the rating given by the majority of golfers is shown.

Exc.: very soft feel with little shock
Good: soft feel with little shock
Av: average
Poor: poor feel with heavy shocks

TABLE 3

| | Example | | | | | Comparative Example | |
|---|---|---|---|---|---|---|---|
| Cover stock | 5 | 6 | 7 | 8 | 9 | 5 | 6 |
| Composition (pbw) | | | | | | | |
| Pandex T7298 | 95 | 90 | 95 | 90 | 85 | 100 | 95 |
| Elvaloy EP4934-6 | 5 | 10 | | | | | |
| Elvaloy AS | | | 5 | 10 | 15 | | |
| PE LF660H | | | | | | | 5 |
| Titanium dioxide | 2.5 | 2.5 | 2.5 | 2.5 | 2.5 | 2.5 | 2.5 |
| Magnesium stearate | 0.7 | 0.7 | 0.7 | 0.7 | 0.7 | 0.7 | 0.7 |
| Specific gravity | 1.16 | 1.14 | 1.16 | 1.14 | 1.12 | 1.18 | 1.16 |
| Hardness (Shore D) | 48 | 48 | 48 | 48 | 48 | 48 | 50 |

Pandex T7298 non-yellowing thermoplastic polyurethane elastomer, Shore D hardness 48, Dai-Nippon Ink & Chemicals K.K.

Elvaloy EP4934-6: low glycidyl methacrylate type ethyleneacrylate-glycidyl methacrylate random terpolymer, E.I. duPont Elvaloy AS: high glycidyl methacrylate type ethylene-acrylate-glycidyl methacrylate random terpolymer, E.I. duPont PE LF660H: low density polyethylene resin, Shore D hardness 55, Mitsubishi Chemical K.K.

TABLE 4

| | Example | | | | | Comparative Example | |
|---|---|---|---|---|---|---|---|
| | 5 | 6 | 7 | 8 | 9 | 5 | 6 |
| Ball weight (g) | 45.5 | 45.3 | 45.5 | 45.3 | 45.1 | 45.7 | 45.3 |
| Ball hardness (mm) | 2.79 | 2.80 | 2.76 | 2.79 | 2.82 | 2.73 | 2.65 |
| Initial velocity (m/s) | 75.5 | 75.4 | 75.4 | 75.4 | 75.4 | 75.5 | 75.3 |
| Scuff resistance | 4.4 | 4.6 | 4.5 | 4.6 | 4.8 | 3.6 | 3.1 |
| Feel | Excellent | Excellent | Excellent | Excellent | Excellent | Excellent | Good |

It is evident from Table 4 that inventive golf balls using cover stocks based on heated mixtures of a thermoplastic polyurethane elastomer and a functional group-modified polyolefin are improved in scuff resistance and hitting feel.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A golf ball cover stock comprising; as a main component a heated mixture consisting essentially of a thermoplastic polyurethane elastomer and an epoxy-modified polyolefin having a number average molecular weight Mn of 10,000 to 50,000, or urethane bonds, epoxy groups, amino groups, and acid groups, wherein said heated mixture has a Shore D hardness of 35 to 55.

2. The cover stock of claim 1, wherein an epoxy component for introducing epoxy groups is glycidyl methacrylate or glycidyl acrylate.

3. The cover stock of claim 1, wherein the epoxy-modified polyolefin further contains a component for softening the epoxy-modified polyolefin having Mn of 10,000 to 50,000 in the heated mixture, the softening component being selected from the group consisting of acrylates, methacrylates and vinyl acetate.

4. A golf ball comprising a cover formed from the cover stock of claim 1.

* * * * *